US007109413B2

(12) United States Patent
Chen

(10) Patent No.: US 7,109,413 B2
(45) Date of Patent: Sep. 19, 2006

(54) INLET WITH HEAT-ISOLATION ELEMENT

(75) Inventor: Chun-Chen Chen, Taoyuan (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 10/858,946

(22) Filed: Jun. 2, 2004

(65) Prior Publication Data

US 2005/0020105 A1 Jan. 27, 2005

(30) Foreign Application Priority Data

Jul. 23, 2003 (TW) .............................. 92120155 A

(51) Int. Cl.
*H02G 3/08* (2006.01)
*H01R 13/00* (2006.01)

(52) U.S. Cl. ................... 174/50; 174/17 VA; 174/52.1; 439/485; 439/76.1; 361/676; 361/688

(58) Field of Classification Search ................ 439/876, 439/96, 95, 877, 878, 879, 880, 881, 882, 439/521, 79, 607, 206, 76.1, 892, 893, 933, 439/620, 108, 949, 485, 906, 487, 106, 874, 439/875; 174/65 R, 50, 52.1, 59, 64, 135, 174/252, 94 R, 94 S, 84 C; 361/600, 641, 361/676, 679, 683, 687, 688, 728

See application file for complete search history.

(56) References Cited

U.S. PATENT DOCUMENTS 5,213,524 A * 5/1993 Okamoto et al. ........... 439/620
5,554,050 A * 9/1996 Marpoe, Jr. ................. 439/620
6,305,985 B1 * 10/2001 Akiha ........................ 439/607
6,430,054 B1 * 8/2002 Iwata ........................ 174/52.1
6,494,724 B1 * 12/2002 Bixler et al. .................. 439/79
6,537,113 B1 * 3/2003 Chen ......................... 439/76.1
6,600,658 B1 * 7/2003 Iwata .......................... 174/50
6,776,650 B1 * 8/2004 Cheng et al. ............. 439/76.1
6,881,069 B1 * 4/2005 Chen ........................... 439/13
6,893,274 B1 * 5/2005 Chen et al. ................. 439/106
6,894,903 B1 * 5/2005 Sato et al. .................. 361/728
7,029,317 B1 * 4/2006 Chen .......................... 439/485

* cited by examiner

*Primary Examiner*—Angel R. Estrada
(74) *Attorney, Agent, or Firm*—Madson & Austin

(57) ABSTRACT

An inlet with a heat-isolation element to be disposed in an opening of an electronic apparatus is disclosed. The inlet comprises a conductive terminal disposed on one surface thereof and a connecting element having one end connecting to the conductive terminal and the other end connecting to a printed circuit board of the electronic apparatus. A heat-isolation element is employed to cover the conductive terminal of the inlet and has at least one hole for passing the connecting element therethrough. By employing the heat-isolation element to cover the conductive terminal of the inlet, the heat-isolation is provided between the inlet and the internal circuit of the electronic apparatus.

19 Claims, 6 Drawing Sheets

INLET WITH HEAT-ISOLATION ELEMENT

FIELD OF THE INVENTION

The present invention relates to an inlet with a heat-isolation element, and more particularly to an AC inlet with a heat-isolation element for use in an adapter or a power supply.

BACKGROUND OF THE INVENTION

Generally, for adapting to AC cables with different specifications and sizes in various countries, an adapter usually includes an AC inlet for electrically connecting to other electronic apparatuses. According to international IC 320 standard safety temperature value, the operation temperature of the AC inlet of the adapter for connecting different AC cables of various countries should be lower than the standard such as 78° C. The adapter used in electronic products will consume partial electric power when being operated. Furthermore, along with the technology development of electronic products, more and more electric units are loaded on the printed circuit board inside the electronic product, resulting in increasing the integration of the electric units. Currently, the electric power for operating most adapters has increased to 100~200 Watts, even over 200 Watts. Since the Watt consumption increases, it is inevitable that the temperature of the whole adapter is increased due to the heat generated from adapter operation. It also increases the difficulty for solving the temperature problem of the AC inlet. It is necessary to consider the international standard safety temperature value of the AC inlet when the adapter is designed and manufactured. Therefore, for complying with the standard, the internal structure of adapter must improve the heat dissipating effect, for example the DC fan addition. However, it causes the cost to increase and the AC inlet structure to change.

Therefore, the purpose of the present invention is to develop an inlet with heat isolation function for efficiently isolating the heat generated from the internal circuit of the adapter and preventing the heat from being conducted to the inlet so as to deal with the above problems encountered in the prior art.

SUMMARY OF THE INVENTION

The main object of the present invention is to provide an inlet with a heat-isolation element which can prevent the increase of the temperature of the inlet by employing the heat-isolation element to cover the conductive terminal of the inlet and prevent the heat generated from the internal circuit of the electronic apparatus from being conducted to the inlet.

To achieve the above-mentioned object, an inlet with a heat-isolation element to be disposed in an opening of an electronic apparatus is provided. The inlet comprises a conductive terminal disposed on one surface thereof and a connecting element having one end connected to the conductive terminal and the other end connected to a printed circuit board of the electronic apparatus. A heat-isolation element is employed to cover the conductive terminal and has at least one hole for passing the connecting element therethrough. Thereby heat isolation is provided between the inlet and the printed circuit board of the electronic apparatus by the heat-isolation element.

In an embodiment, the heat-isolation element is secured to the inlet by one selected from a group consisting of engagement, ultrasonic welding, riveting or thermal molding.

In an embodiment, the connecting element is one of a power cord or a connecting pin.

In an embodiment, a first chamber is formed in the interior of the electronic apparatus and a second chamber is formed between the heat-isolation element and the inlet.

In an embodiment, a heat-isolating material is introduced into the second chamber. Preferably, the heat-isolating material is one selected from a group consisting of air, polymeric foam, and heat-isolating cotton.

In an embodiment, the inlet further comprises an engaging element disposed on one side thereof. Preferably, the engaging element is one selected from a group consisting of a protrusion, a rib and a clip.

In an embodiment, the heat-isolation element further comprises a hollow part therein.

In an embodiment, the conductive terminal of the inlet is covered completely by the heat-isolation element.

In an embodiment, one side of the heat-isolation element and the opening of the electronic apparatus comprise an engagement mechanism, respectively.

In an embodiment, the electronic apparatus is one of an adapter and a power supply.

In an embodiment, the heat-isolation element is substantially rectangle-shaped, cover-shaped, or inverted-L-shaped.

To achieve the above object of the present invention, an inlet with a heat-isolation element to be disposed in an opening of an electronic apparatus is provided. The inlet comprises a conductive terminal disposed on one surface thereof and a connecting element having one end connected to the conductive terminal and the other end connected to a printed circuit board of the electronic apparatus. A heat-isolation element is disposed between the printed circuit board of the electronic apparatus and the inlet and covers the conductive terminal of the inlet, wherein the heat-isolation element comprises a hole for just passing the connecting element therethrough. Thereby a first chamber is formed in the interior of the electronic apparatus for receiving the printed circuit board therein and a second chamber is formed between the inlet and the heat-isolation element for receiving the inlet therein.

Now the foregoing and other features and advantages of the present invention will be best understood through the following descriptions with reference to the accompanying drawings, wherein:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

The present invention provides an inlet with a heat-isolation element. The heat generated from the internal circuit of the electronic apparatus is isolated by the heat-isolation element and cannot be conducted to the inlet of the electronic apparatus. Hence, the over-temperature condition of the inlet can be avoided to comply with the international IC 320 standard. The present invention can be used in an adapter or a power supply. The following embodiments use an adapter as examples to describe the present invention more specifically.

Figure 1:
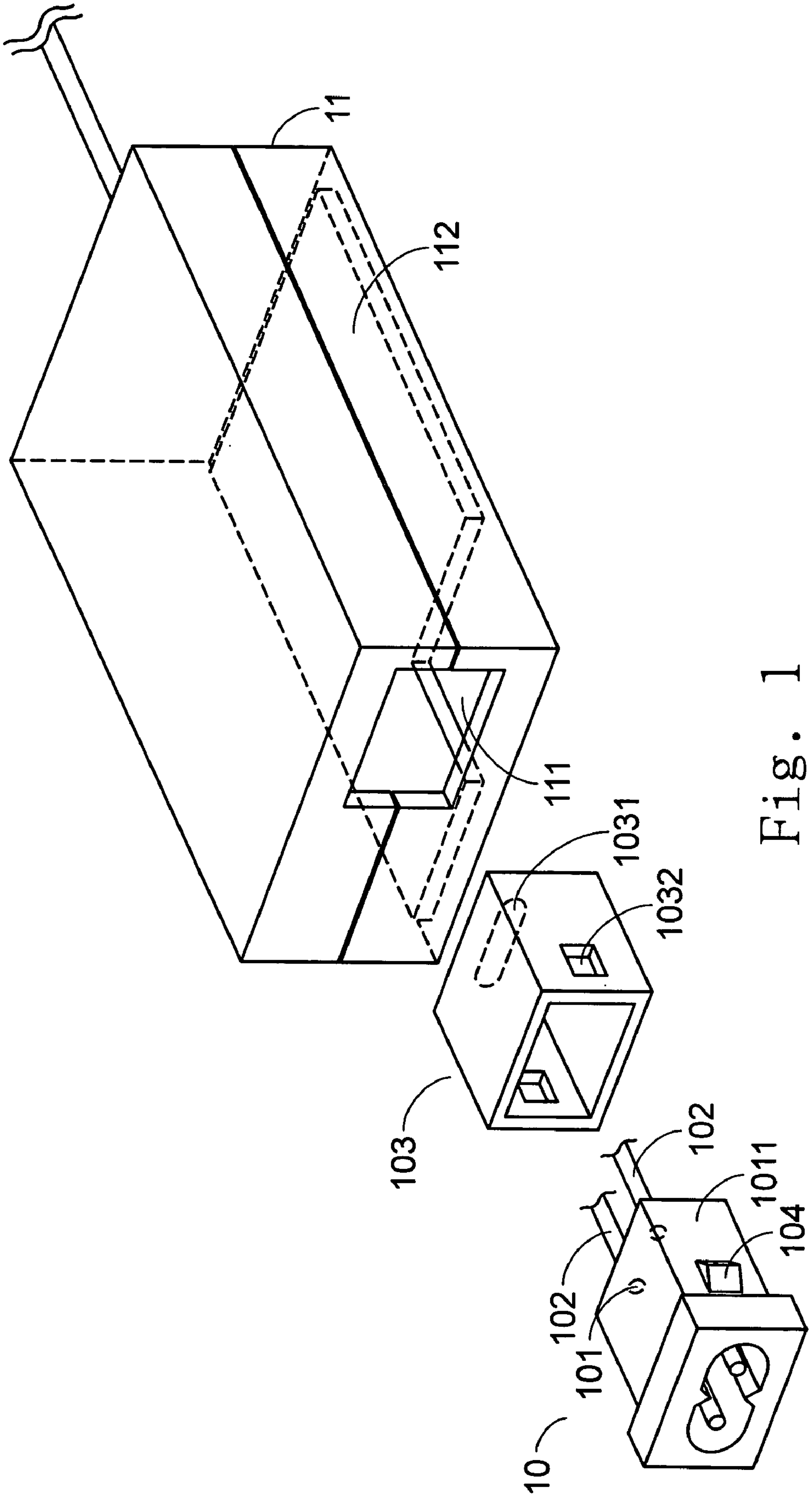
FIG. 1 is a schematic view showing the inlet with a heat-isolation element according to a first preferred embodiment of the present invention.

Please refer to FIG. 1, which shows an inlet with a heat-isolation element according to a preferred embodiment of the present invention. The inlet 10 is disposed in an opening 111 of an adapter 11, wherein the adapter 11 includes a printed circuit board 112 disposed in the internal space thereof. The inlet 10 includes a conductive terminal 101 and a connecting element 102. The conductive terminal 101 is disposed on a surface 1011 of the inlet 10. The connecting element 102 is a power cord having one end connected to the terminal 101 and the other end connected to the printed circuit board 112 of the adapter 11. A heat-isolation element 103 wraps around the inlet 10 and includes holes 1031 for allowing the connecting element 102 to pass therethrough to achieve electrical connection between the inlet 10 and printed circuit board 112. The heat-isolation element 103 is in the shape of rectangle and covers the conductive terminal 101 completely. When the adapter 11 is in use, the heat generated from the printed circuit board 112 of the adapter 11 is isolated by the heat-isolation element 103 and cannot be conducted to the inlet 10. This is because that the heat-isolation element 103 is disposed between the inlet 10 and the printed circuit board 112 and covers the conductive terminal 101, which is the one that most easily elevates its temperature. In this way, when the adapter is in use and the printed circuit board 112 of the adapter 11 elevates its temperature, the heat generated from the printed circuit board 112 will not have direct influence on the temperature of the inlet 10. Therefore, it becomes possible to control the temperature of the inlet 10. In addition, to assure that the heat-isolation element 103 can be firmly secured to the inlet 10, the inlet 10 further includes an engaging element 104 disposed on any one side of the inlet 10, and the heat-isolation element 103 has a corresponding aperture 1032. By the engagement of the engaging element 104 and the corresponding aperture 1032, the heat-isolation element 103 can be firmly secured to the inlet 10, and it can further assure that the conductive terminal 101 can be completely covered. Furthermore, when installing the combination of the inlet 10 and the heat-isolation element 103 into the opening 111 of the adapter 11, there is no need to alter the size of the opening 111 of the adapter 11. Therefore, the present invention can be applied to any adapter or power supply in a standard size without any modification, additional cost or time.

Figure 2:
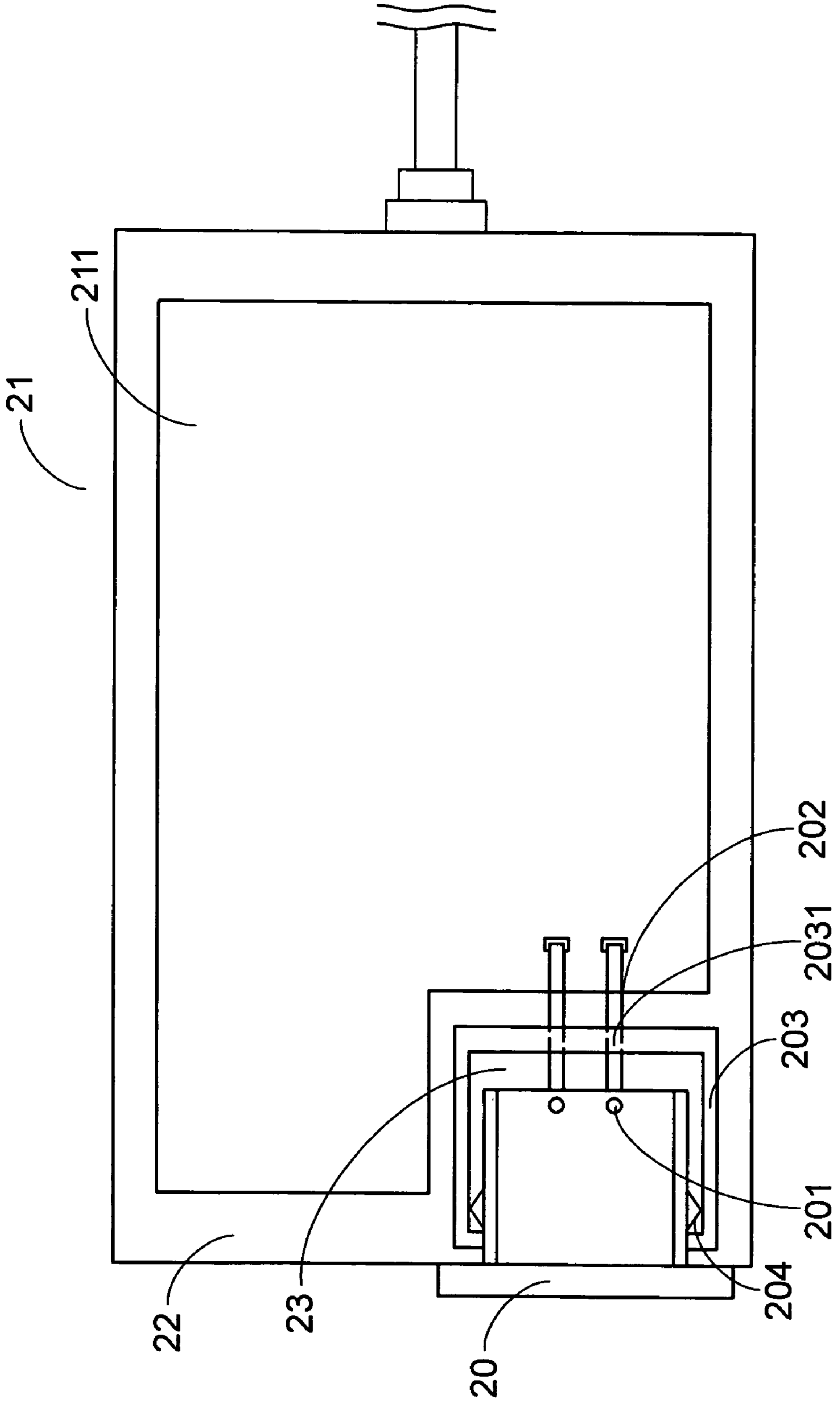
FIG. 2 is a schematic view showing the inlet with a heat-isolation element according to a second preferred embodiment of the present invention.

In addition, to further lower the influence of heat generated from the printed circuit board on the inlet, a first chamber and a second chamber can be formed in the interior of the adapter by the heat-isolation element. Please refer to FIG. 2, which is a schematic view showing the inlet with a heat-isolation element according to a second preferred embodiment of the present invention. As shown in FIG. 2, just like the above-mentioned preferred embodiment of the present invention, the inlet 20 includes a conductive terminal 201 and a connecting element 202. The conductive terminal 201 is disposed on a surface of the inlet 20. The connecting element 202 is a power cord having one end connected to the conductive terminal 201 and the other end connected to the printed circuit board 211 of the adapter 21. A heat-isolation element 203 wraps around the inlet 20 and includes holes 2031 for just allowing the connecting element 202 to pass therethrough to achieve electrical connection between the inlet 20 and printed circuit board 211. The heat-isolation element 203 is in the shape of rectangle and covers the conductive terminal 201 completely.

In this way, with the isolation created by the heat-isolation element 203, a first chamber 22 and a second chamber 23, respectively in airtight condition, are formed in the interior of the adapter 21. The first chamber 22 receives the printed circuit board 211 therein, and the second chamber 23 receives the inlet 20 therein. There is some space in the second chamber 23 for receiving heat-isolating materials, such as air with higher specific heat, polymeric foam of better isolating effect, and heat-isolating cotton that can be easily obtained. According to the different needs, these materials can further cooperate with one another. By introducing these heat-isolating materials into the second chamber 23, which is disposed between the heat-isolation element 203 and the inlet 20, the heat generated from the printed circuit board 211 can be further isolated. When the adapter 21 is in use, the heat generated from the printed circuit board 211 of the adapter 21 is isolated by the heat-isolation element 203 and the heat-isolating materials and cannot be conducted to the inlet 20. Therefore, the temperature of the inlet 20 will not exceed the international safety standard. In addition, to assure that the heat-isolation element 203 is firmly secured to the inlet 20, a protrusion 204 can be disposed on any one side of the inlet 20 as an engaging element. When installing the combination of the inlet 20 and the heat-isolation element 203 into the opening of the adapter 21, there is no need to alter the structure and opening size of the adapter 21. Besides, the heat-isolating materials introduced into the second chamber can be easily obtained. So, any electronic apparatus that needs an inlet with a heat-isolation element can be designed and produced without increasing much cost. In this way, the object of the present invention is achieved.

Figure 3:
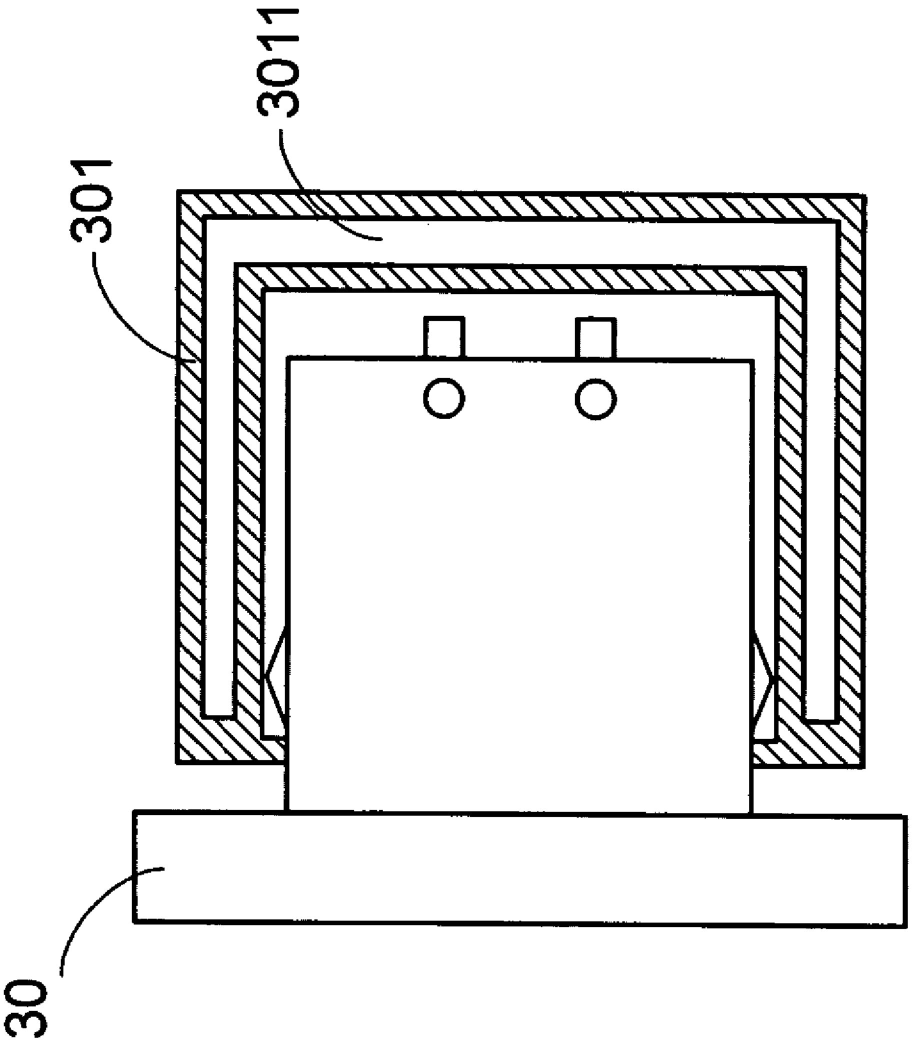
FIG. 3 is a schematic view showing the inlet with a heat-isolation element according to a third preferred embodiment of the present invention.

In addition, the heat-isolation element can also include a hollow part therein. Please refer to FIG. 3, which is a schematic view showing the inlet with a heat-isolation element according to a third preferred embodiment of the present invention. As shown in FIG. 3, the heat-isolation element 301 of the inlet 30 can also include a hollow part 3011 therein. Air or heat-isolating materials can be introduced into the hollow part 3011 of the heat-isolation element 301 to isolate the heat generated from the printed circuit board (not shown) and prevent the heat from being conducted to the inlet 30 more effectively. Therefore, the heat-isolation element 30 as shown in FIG. 3 can prevent the temperature of the inlet 30 from increasing.

Figure 4:
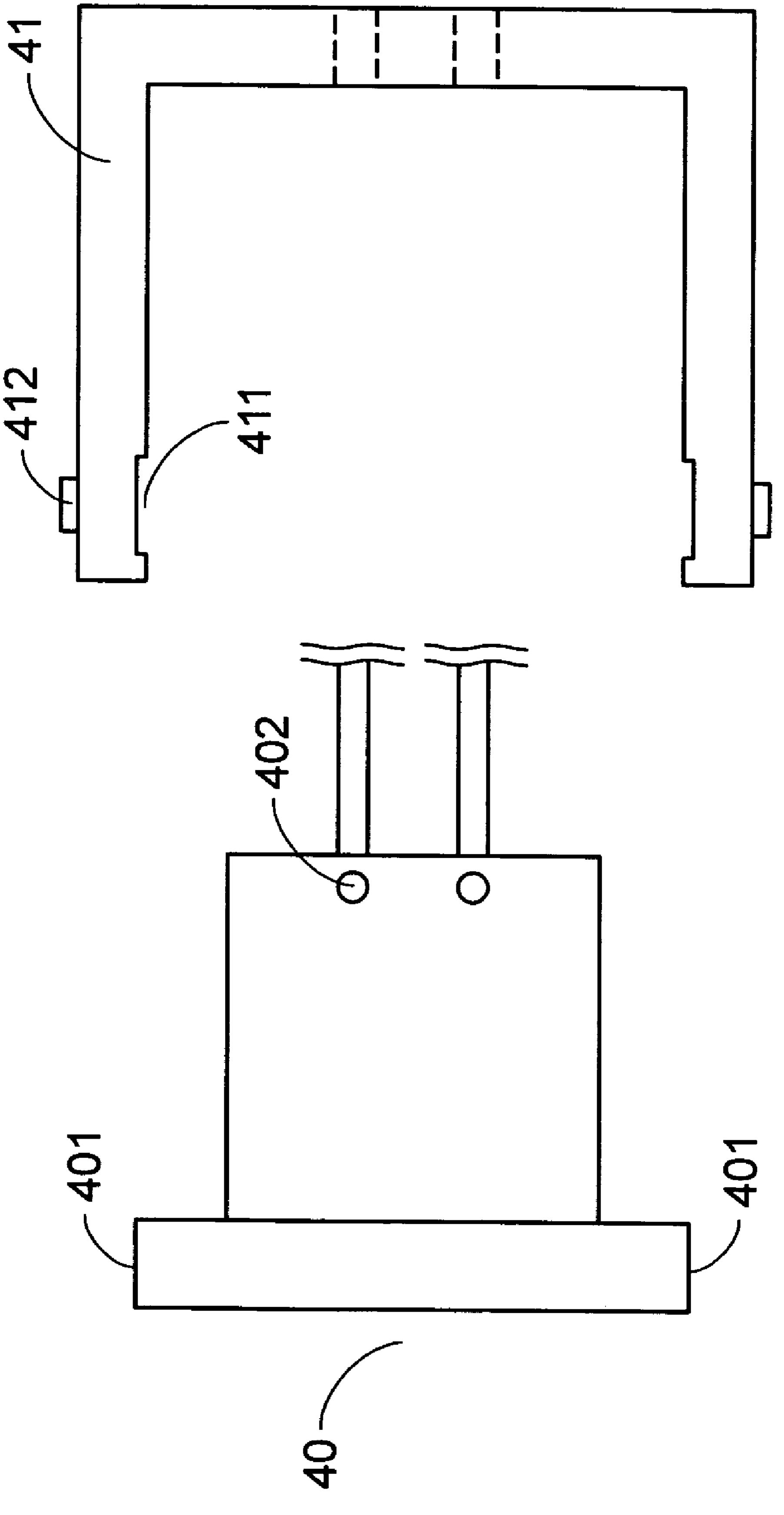
FIG. 4 is a schematic view showing the inlet with a heat-isolation element according to a fourth preferred embodiment of the present invention.

Certainly, the size and installing method of the heat-isolation element can be modified according to different needs. Please refer to FIG. 4, which is a schematic view showing the inlet with a heat-isolation element according to a fourth preferred embodiment of the present invention. As shown in FIG. 4, the heat-isolation element 41 have a concave portion 411 for engaging with the front portion 401 of the inlet 40 so that the heat-isolation element 41 is secured to the inlet 40 firmly and covers the conductive terminal 402 of the inlet 40 completely. Besides, a protrusion 412 is disposed on the external periphery of the heat-isolation element 41 as an engagement mechanism so that the combination of the inlet 40 and the heat-isolation element 41 can be more firmly installed in the opening of the adapter (not shown). Certainly, a corresponding engagement mechanism can also be disposed on the internal periphery of the opening of the adapter so that the heat-isolation element 401 is secured to the inlet 40 firstly and then the inlet 40 and the heat-isolation element 41 together are installed into the opening of the adapter (not shown). In this way, the heat generated from the printed circuit board of the adapter will not be conducted directly to the inlet 40, and thus will not elevate the temperature of the inlet 40.

Figure 5:
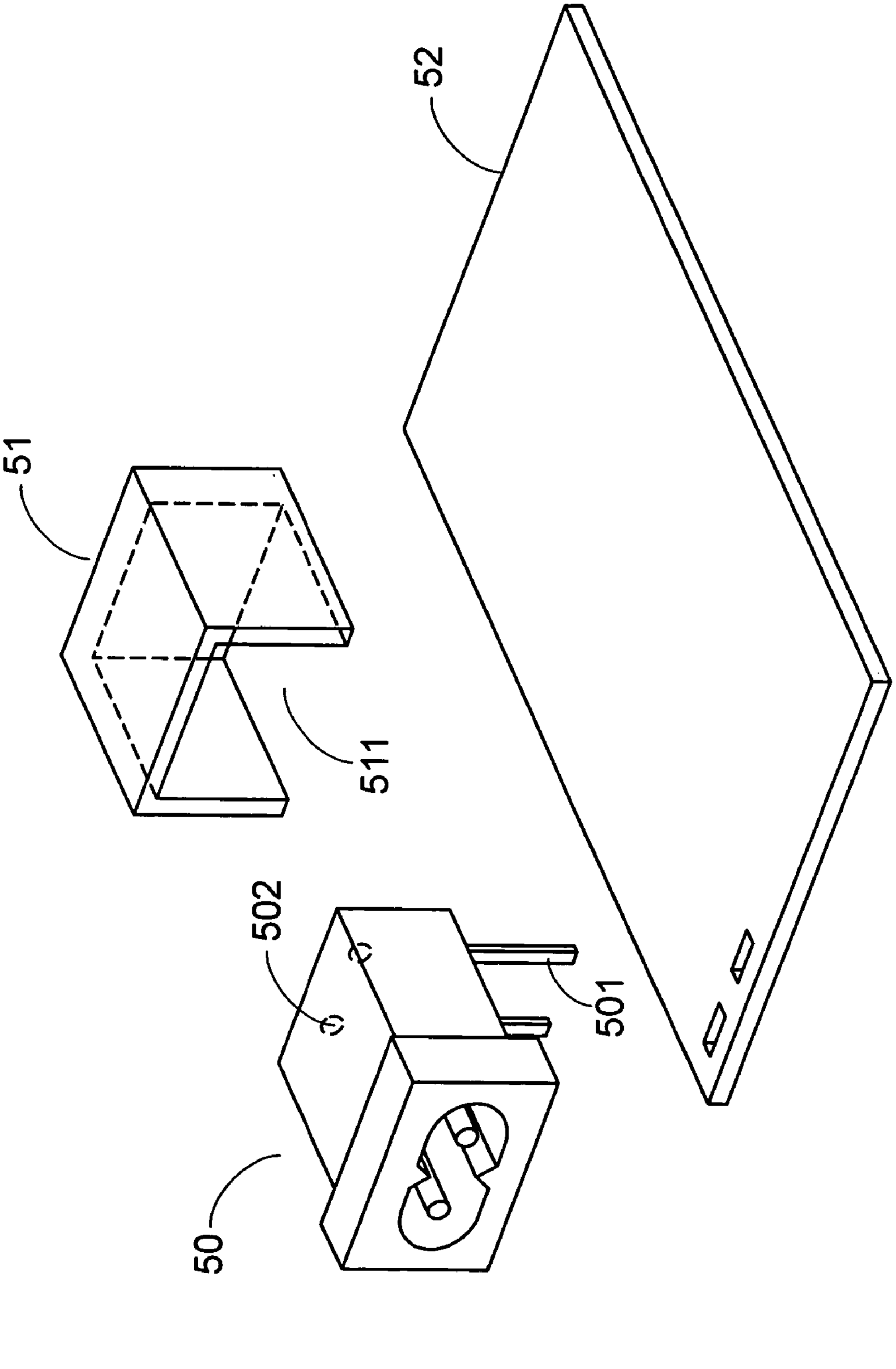
FIG. 5 is a schematic view showing the inlet with a heat-isolation element according to a fifth preferred embodiment of the present invention.
Figure 6:
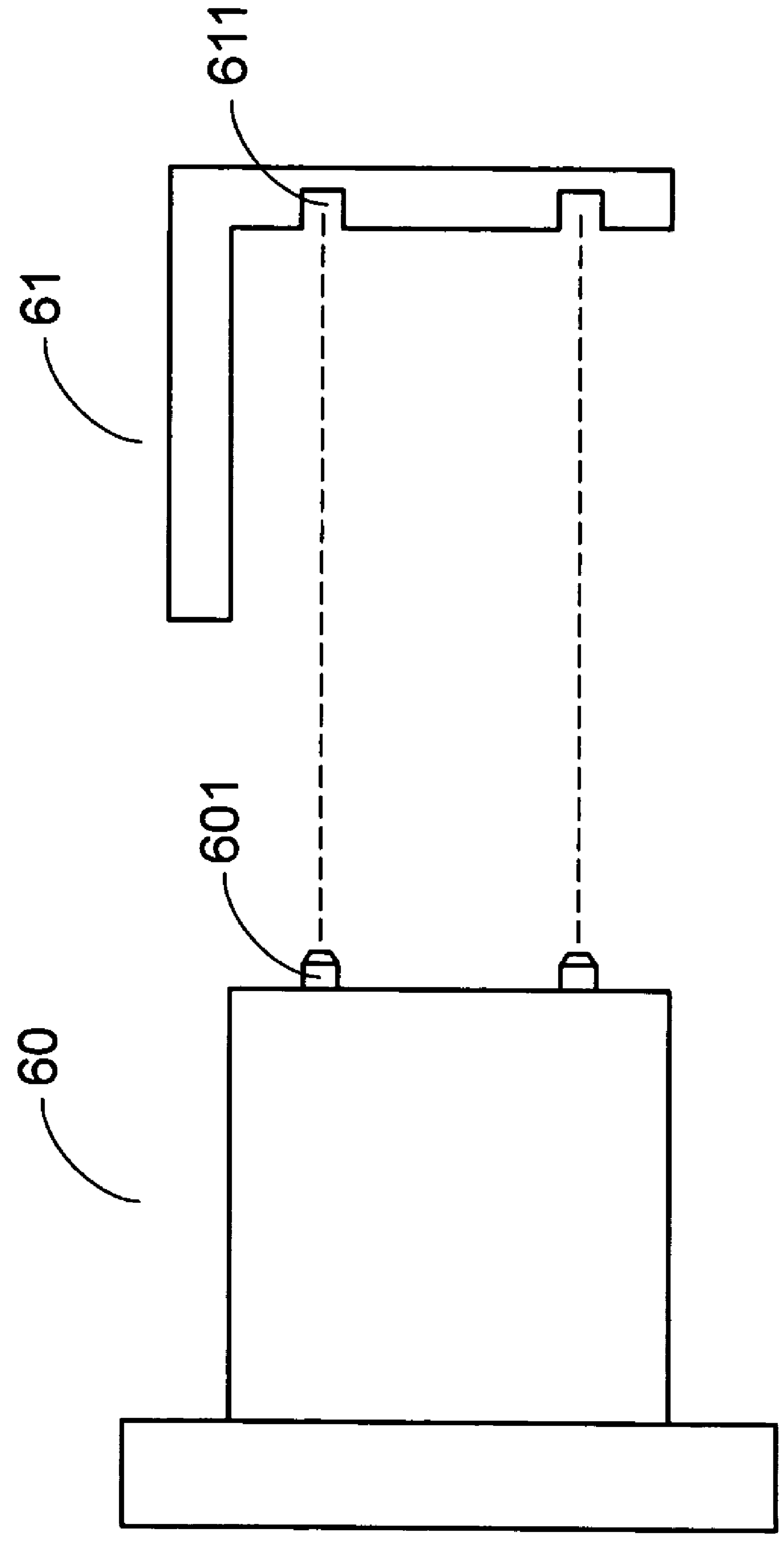
FIG. 6 is a schematic view showing the inlet with a heat-isolation element according to a sixth preferred embodiment of the present invention.

Please refer to FIG. 5, which is a schematic view showing the inlet with a heat-isolation element according to a fifth preferred embodiment of the present invention. As shown in FIG. 5, a connecting pin 501 is used as the connecting element. One end of the connecting pin 501 is connected to the conductive terminal 502 of the inlet 50 and the other end of the connecting pin 501 is passing the opening 511 at the bottom of the heat-isolation element 51 and inserted into the via hole of the printed circuit board 52. Further, to assure that the heat-isolation element 51 can completely cover the conductive terminal 502 of the inlet 50, an ultrasonic welding method can be used to connect the heat-isolation element 51 with the inlet 50 when installing the heat-isolation element 51. In this way, the heat-isolation element 51 can be firmly secured to the inlet 50 and the heat generated from the printed circuit board 52 can be isolated by the heat-isolation element 51 and cannot be conducted toward the inlet 50. Certainly, except the ultrasonic welding method, other methods or engaging elements can be employed to connect the heat-isolation element with the inlet. For example, please refer to FIG. 6, which is the sixth preferred embodiment of the present invention. At least one rivet 601 is disposed on any one side of the inlet 60. The rivet 601 can also be replaced with a pillar for thermal molding. A corresponding hole 611 is disposed on the surface of the heat-isolation element 61 for receiving the rivet 601. In this way, the heat-isolation element 61 can be secured to the inlet 60, and the heat-isolation element 61 can completely cover the conductive terminal (not shown) of the inlet 60 to isolate the heat generated from the printed circuit board of the adapter (not shown).

The hole of the heat-isolation element isn't limited to the location as shown in the FIG. 1, other modifications, which allow the connecting element to pass through and to connect with the printed circuit board, can also be applied to the present invention. In addition, the engaging element isn't limited to the protrusion as described above; the engaging element of the present invention can further be replaced by other elements such as hooks. Furthermore, the shape of the heat-isolation element is not limited to rectangle-shaped, cover-shaped, or inverted L-shaped as shown above, any other shape of the heat-isolation element, which can cover the conductive terminal of the inlet, can also be applied to the present invention. In addition, the shape and materials of the connecting elements aren't limited to the shape and materials as described above. A power cord or connecting pin can also be applied to the present invention. Furthermore, all the elements of the inlet with the heat-isolation element can be modified according to different needs.

To sum up, the present invention provides a heat-isolation element to cooperate with the inlet and cover the conductive terminal of the inlet, which is the most easily heated portion of the inlet. The heat-isolation element can effectively isolate the heat generated from the printed circuit board of the adapter or power supply so as to prevent the temperature of the inlet from going so high that it cannot meet the safety standard of the IC 320 specification. Furthermore, the materials and elements used in the present invention are all very cheap and obtainable. Besides, the casing of the adapter or power supply needn't suffer from further modifications so the standard adapter or power supply that can be found on the market can all use the inlet and heat-isolation element of the present invention. Therefore, no additional cost or time is needed.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An inlet with a heat-isolation element to be disposed in an opening of an electronic apparatus, comprising:

an inlet having a conductive terminal having one end for receiving power and the other end disposed on one surface of said inlet;

a connecting element having one end connected to said conductive terminal and the other end connected to a printed circuit board of said electronic apparatus; and a heat-isolation element covering said inlet and said conductive terminal and having at least one hole for passing said connecting element therethrough;

thereby heat isolation is formed between said inlet and said printed circuit board of said electronic apparatus by said heat-isolation element.

2. The inlet according to claim 1 wherein said heat-isolation element is secured to said inlet by one selected from a group consisting of engagement, ultrasonic welding, riveting or thermal molding.

3. The inlet according to claim 1 wherein said connecting element is one of a power cord or a connecting pin.

4. The inlet according to claim 1 wherein a first chamber is formed in the interior of said electronic apparatus and a second chamber is formed between said heat-isolation element and said inlet.

5. The inlet according to claim 4 wherein a heat-isolating material is introduced into said second chamber.

6. The inlet according to claim 5 wherein said heat-isolating material is one selected from a group consisting of air, polyfoam and heat-isolating cotton.

7. The inlet according to claim 1 wherein said inlet further comprises an engaging element disposed on one side thereof.

8. The inlet according to claim 7 wherein said engaging element is one selected from a group consisting of a protrusion, a rib and a clip.

9. The inlet according to claim 1 wherein said heat-isolation element further comprises a hollow part therein.

10. The inlet according to claim 1 wherein said conductive terminal of said inlet is covered completely by said heat-isolation element.

11. The inlet according to claim 1 wherein one side of said heat-isolation element and said opening of said electronic apparatus comprise an engagement mechanism, respectively.

12. The inlet according to claim 1 wherein said electronic apparatus is one of an adapter and a power supply.

13. The inlet according to claim 1 wherein said heat-isolation element is substantially rectangle-shaped, cover-shaped or inverted-l-shaped.

14. An inlet with a heat-isolation element to be disposed in an opening of an electronic apparatus, comprising:

an inlet having a conductive terminal having one end for receiving power and the other end disposed on one surface of said inlet;

a connecting element having one end connected to said conductive terminal and the other end connected to a printed circuit board of said electronic apparatus; and a heat-isolation element disposed between said printed circuit board of said electronic apparatus and said inlet and covering said inlet and said conductive terminal of said inlet, wherein said heat-isolation element comprises a hole for just passing said connecting element therethrough;

thereby a first chamber is formed in the interior of said electronic apparatus for receiving said printed circuit board therein and a second chamber is formed between said inlet and said heat-isolation element for receiving said inlet therein.

15. The inlet according to claim 14 wherein said heat-isolation element is secured to said inlet by one selected from a group consisting of engagement, ultrasonic welding, riveting or thermal molding.

16. The inlet according to claim 14 wherein said connecting element is one of a power cord or a connecting pin.

17. The inlet according to claim 16 wherein a heat-isolating material is introduced into said second chamber.

18. The inlet according to claim 17 wherein said heat-isolating material is one selected from a group consisting of air, polyfoam and heat-isolating cotton.

19. The inlet according to claim 14 wherein said heat-isolation element further comprises a hollow part therein.

* * * * *